Dec. 28, 1926.  1,612,426
F. L. FISHER
SLIDABLE PISTON RING
Filed July 23, 1925   2 Sheets-Sheet 2
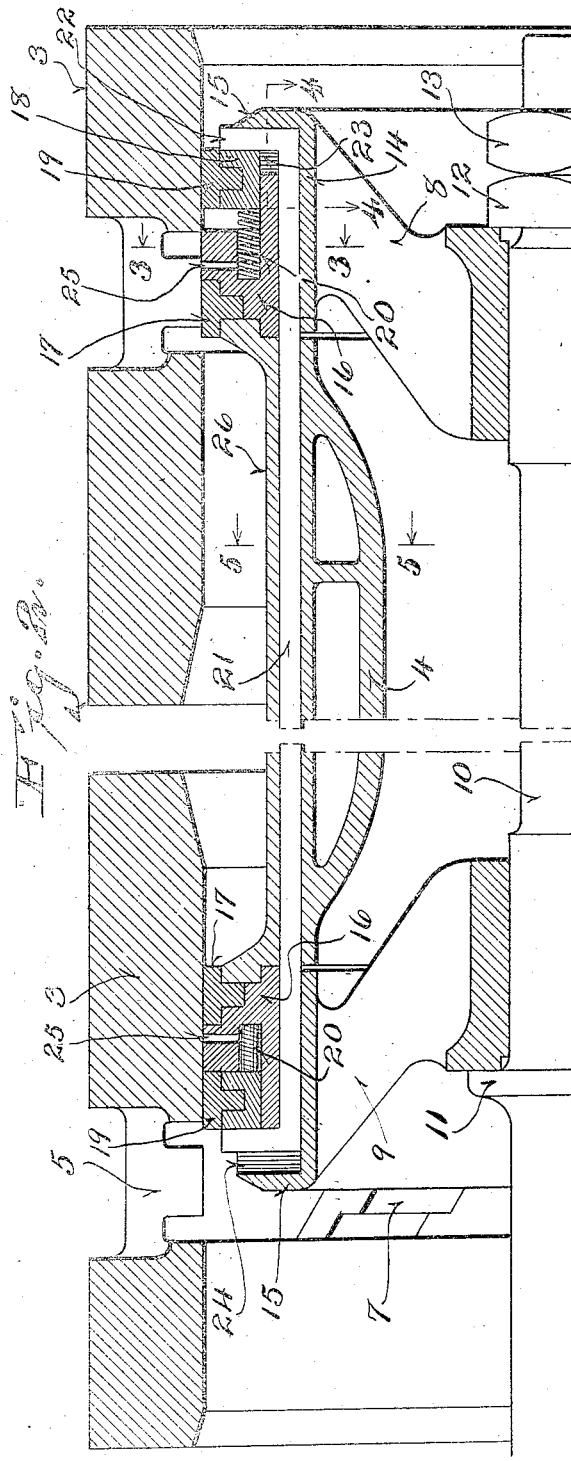
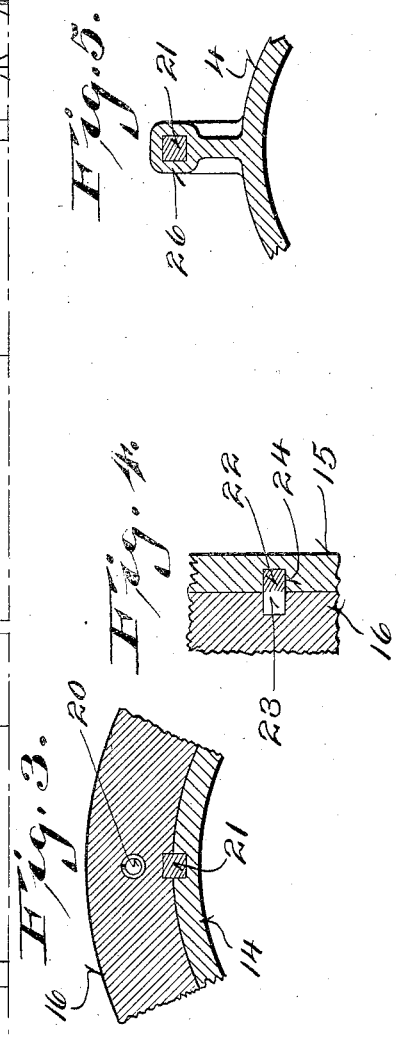
Inventor
Frank L. Fisher Patented Dec. 28, 1926.

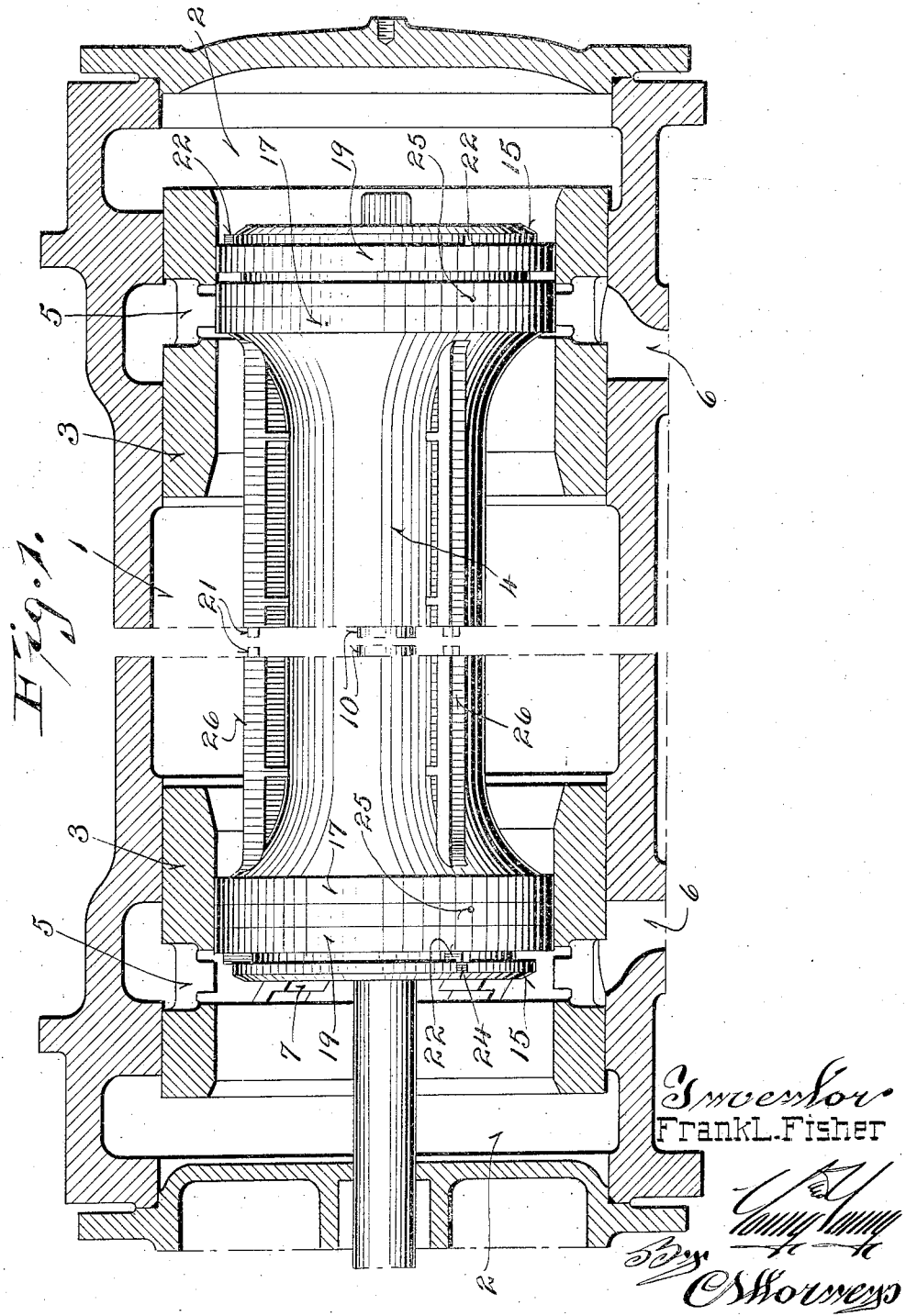

1,612,426

UNITED STATES PATENT OFFICE.

FRANK L. FISHER, OF MILWAUKEE, WISCONSIN.

SLIDABLE PISTON RING.

Application filed July 23, 1925. Serial No. 45,691.

This invention relates to valve mechanism for steam engines.

An object of this invention is broadly to provide means by which the establishment of communication between the end of the cylinder and the exhaust ports and the interruption of the same may be delayed so that the expanding steam in the cylinder may have a longer time to act, and the cylinder may have, during exhaust, a longer time within which to discharge the exhaust steam and thereby prevent back pressure and result generally in a more efficient operation of the engine.

In valves for steam engines in which slidable rings are employed, difficulty has been experienced due to the irregular action of these rings and due to the lack of synchronism of the operation of the rings.

This invention is designed to overcome the defects noted above, and objects of such invention are to provide a valve for a steam engine in which movable rings are employed, and in which means are provided for positively connecting the ring, thus insuring simultaneous and correct operation thereof, and to provide means whereby undesirable leaking of steam into spaces adjacent the ring is avoided, so that the rings operate as they are intended without interference.

An embodiment of the invention is shown in the accompanying drawings, in which:—

Figure 1 is a longitudinal sectional view through the valve casing or steam chest showing the parts in the position which they occupy in practice, such view being broken away and shortened.

Figure 2 is an enlarged detail showing portions of opposite ends of the valve.

Figures 3, 4 and 5 are sectional views on the lines 3—3, 4—4, and 5—5 of Figure 2.

Referring in detail to the drawings, it will be seen that the high pressure steam chambers are indicated at 1 and the low pressure or exhaust chamber is indicated by reference character 2. Suitable liners 3 are provided within the casing and slidably receive the ends of the hollow valve 4. The liners 3 are provided with ducts or annular passages 5 which communicate with the inlet ports 6 of the steam cylinder.

If desired, a plurality of bridge pieces or connecting members, such as indicated at 7 in Figure 1, may be provided and these members may span a portion of the annular passageways 5 through the liners, as illustrated in the drawings.

The valve 4 is formed of two spiders 8 and 9 whose hubs are carried upon the valve rod 10, such valve rod being provided with a collar 11 at one end and with a clamping nut 12 at the other to force the spiders towards each other, a suitable lock nut 13 being provided.

The spiders 8 each support annular rings or followers 14 which are provided with upstanding marginal flanges 15. These followers engage rings 16 commonly known as bull rings and force such rings tightly against the ends of the valve body 4. It is to be noted that the bull rings 16 engage packing rings 17 which are stationary with reference to the valve body 4. Further, each of the members 16 slidably carries collars 18 which are slotted to receive the movable packing rings 19. These packing rings 19 are urged outwardly towards the flanges 15 by means of springs 20, as illustrated particularly in Figure 2.

It is to be noted that rods, preferably squared rods, 21 connects the movable ring at opposite ends of the valve. Each rod has upturned ends 22 which are positioned outside of the collar portion 18 of the movable rings.

Further, it is to be noted that the bull rings 16 are slotted, as indicated at 23, to guide the upturned portions 22 of the rods 21 and further it is to be noted that the flanges 15 of the followers are slotted, as indicated at 24, to receive the upturned ends of the rods 21. Preferably, three or more rods 21 are employed.

In order to provide for the actuation of the movable rings an angular duct 25 is provided at regularly spaced points around the periphery of the bull ring 16. These ducts include the openings for the springs 20 and open inwardly into the space between the movable rings and the stationary or bull ring 16.

Preferably, the rods 21 are carried in tubular members 26 which are supported by suitable webs from the body of the valve 4, as indicated in detail in Figures 2 and 5.

The operation of the apparatus is as follows:—When steam is admitted to the cylinder ports through the ports 5 in the liners, this high pressure steam passes through the ducts 25 at one end of the valve and urges the movable rings outwardly. This forces the rods 21 in the same direction and draws the ring at the other end of the valve inwardly. This action of the rings causes the exhaust to open at a delayed period and consequently secures a more perfect expansion of the steam in the cylinder. However, the exhaust remains open for a longer period and thus insures a more complete discharge of the steam from the cylinders.

It will be seen that the valve improves the efficiency of the engine. Further, it will be seen that the action of the rings is simultaneous and this synchronizing is secured in a positive manner by means of the connecting rods passing through the valve body. the rings, therefore, are not dependent upon friction for their operation, but are positively moved in opposite directions in a certain and reliable manner.

Although the invention has been described in considerable detail, it is to be understood that the invention may be variously embodied and is, therefore, to be limited only as claimed.

In addition to the function previously stated for the springs 20, they also serve as cushioning devices and prevent shock to the moving parts.

I claim:

1. Valve mechanism for steam engines comprising a steam chest, a pair of liners therein having annular ports communicating with the ports in the cylinder, a tubular valve slidably mounted within the liners and controlling the opening of said ports, said tubular portion having fixed cutoff rings and movable rings adjacent the exhaust ends of the valve, and rods communicating motion from a movable ring adjacent one end of the valve to a movable ring adjacent the other end of the valve.

2. Valve mechanism for steam engines comprising a steam chest, a pair of liners therein having annular ports communicating with the ports in the cylinder, a tubular valve slidably mounted within the liners and controlling the opening of said ports, said tubular portion having fixed cutoff rings and movable rings adjacent the exhaust ends of the valve, and rods communicating motion from a movable ring adjacent one end of the valve to a movable ring adjacent the other end of the valve, said valve having ports therein adapted to permit the passage of high pressure steam into the space adjacent the movable rings when the ports are open to the high pressure steam.

3. Valve mechanism for steam engines comprising a valve casing, a tubular valve mounted therein, said casing having ports therethrough communicating with opposite ends of the cylinder, said valve having stationary rings controlling the admission of high pressure steam to the ports, and having movable rings controlling the exhausting of steam through the ports, rods communicating motion from a movable ring adjacent one end of the valve to a movable ring adjacent the other end of the valve, ducts formed in the stationary rings and communicating with the space adjacent the movable rings, said ducts being adapted to open into the said ports, and springs holding the movable rings in contact with said rods.

4. Valve mechanism for steam engines comprising a valve casing, a tubular valve mounted therein, said casing having ports therethrough communicating with opposite ends of the cylinder, said valve having stationary rings controlling the admission of high pressure steam to the ports, and having movable rings controlling the exhausting of steam through the ports, rods communicating motion from a movable ring adjacent one end of the valve to a movable ring adjacent the other end of the valve, ducts formed in the body portion of the valve and communicating with the space adjacent the movable rings, said ducts being adapted to open into the said ports, and springs holding the movable rings in contact with said rods, said valve having casings surrounding said rods.

In testimony that I claim the foregoing I have hereunto set my hand at Milwaukee, in the county of Milwaukee and State of Wisconsin.

FRANK L. FISHER.